United States Patent [19]

Matsuo et al.

[11] Patent Number: 5,149,062

[45] Date of Patent: Sep. 22, 1992

[54] PREREDUCTION FURNACE OF A SMELTING REDUCTION FACILITY OF IRON ORE

[75] Inventors: Masahiro Matsuo; Genji Kanatani, both of Kawasaki, Japan

[73] Assignee: NKK Corporation, Tokyo, Japan

[21] Appl. No.: 657,668

[22] Filed: Feb. 19, 1991

[30] Foreign Application Priority Data

Feb. 27, 1990 [JP] Japan .................................. 2-044373

[51] Int. Cl.⁵ .............................................. C22B 5/14
[52] U.S. Cl. ....................................... 266/172; 75/446
[58] Field of Search ........................... 266/172; 75/446

[56] References Cited

U.S. PATENT DOCUMENTS 3,892,046  7/1975  Cooke .
4,226,830  10/1980 Davis .
4,886,246  12/1989 Maeda et al. ...................... 266/172

FOREIGN PATENT DOCUMENTS 0019422  11/1980  European Pat. Off. .
0316819   5/1989  European Pat. Off. .
 104410   6/1984  Japan ................................. 266/172

OTHER PUBLICATIONS

Patent Abstracts of Japan, vol. 12, No. 117, Apr. 14, 1988, JP-A-62 241 548 (Power Reactor & Nuclear Fuel Dev) Oct. 22, 1987.

Primary Examiner—Melvyn J. Andrews
Attorney, Agent, or Firm—Frishauf, Holtz, Goodman & Woodward

[57] ABSTRACT

A prereduction furnace of a smelting reduction facility of iron ore includes a fluidizing prereduction chamber installed at an upper part of the prereduction furnace wherein iron ores are fed and prereduced, a gas blowing chamber installed at a lower part of the prereduction furnace wherein a reducing gas is fed, a distributor installed between the fluidizing prereduction chamber and the gas blowing chamber, a first plurality of nozzles passing through the distributor for injecting the reducing gas in the gas blowing chamber into the fluidizing prereduction chamber, a discharge pipe for discharging prereduced iron ores installed at a bottom center portion of the fluidizing prereduction chamber and extending through the distributor, wherein a cooling fluid flows, at least two horizontally movable gas purging pipes arranged below the distributor, and a second plurality of nozzles attached to the horizontally movable gas purging pipes for injecting a purging gas to a bottom surface of the distributor to prevent clogging of lower ends of the first plurality of nozzles.

4 Claims, 3 Drawing Sheets

PREREDUCTION FURNACE OF A SMELTING REDUCTION FACILITY OF IRON ORE

BACKGROUND OF THE INVENTION

1. Field of the Invention

This invention relates to the field of metallurgy, and in particular to a smelting reduction facility, and more particularly to a prereduction furnace of a smelting reduction facility of iron ore.

2. Description of the Related Art

In a smelting reduction facility of iron ore, the facility is generally divided into two major furnaces which are a prereduction furnace and a smelting reduction furnace. The smelting reduction furnace is usually a convertor type reaction vessel. In the smelting reduction furnace, iron ore and a carbonaceous material are fed to a molten iron bath and oxygen is injected into the bath from above the bath through a lance, by which the iron ore is reduced by a smelting reduction reaction. In the prereduction furnace, the iron ore to be fed to the smelting reduction furnace is prereduced by an exhaust gas from the smelting reduction furnace. The prereduction furnace is of a fluidized bed type in which the exhaust gas from the smelting reduction furnace is utilized for fluidizing and reducing of the iron ore since the process is economical.

FIG. 1 is an explanatory illustration of a smelting reduction facility.

As shown in FIG. 1, the smelting reduction facility comprises the smelting reduction furnace 1, the prereduction furnace 2 which prereduces the iron ores which are to be fed to the smelting reduction furnace 1, the storage bin 3 for a main raw material, i.e., iron ores and the storage bin 4 for auxiliary raw materials.

The smelting reduction furnace 1 comprises the convertor type reaction vessel 5, the lance 6 inserted through the top opening 5a of the reaction vessel 5, the gas injection nozzles 7 through which a stirring gas is injected into the metal bath, the chute 9 for feeding the prereduced iron ores installed at the hood 8 and the chute 10 for feeding the auxiliary raw materials also installed at the hood 8.

The prereduction furnace 2 comprises the distributor 12 incorporating a large number of nozzles 13, the gas blowing chamber 14 at the bottom of the distributor 12 and the prereduction chamber 15. In the gas blowing chamber 14, a gas inlet 16 is installed. In the prereduction chamber 15, a chute 17 for feeding the iron ores and the gas exhaust outlet 18 are.

The prereduced ores are introduced to the discharge pipe 19 via the discharge hole 12a installed at the center of the distributor 12. The discharge pipe extends downward through the bottom of the prereduction furnace 2 and is connected to the supply chute 9 via the L-shaped valve 20 and two intermediate storage bins 21.

The gas outlet 11 installed at the hood 8 is connected to the gas supply pipe 22 which is connected to the gas inlet 16 via the dust collecting cyclone 23. The gas exhaust outlet 18 is connected to the gas exhaust pipe 24 which is connected to the dust collecting cyclone 25.

The duct 26 connects the storage bin 3 to the chute 17 for the prereduction chamber 15. The duct 27 connects the storage bin 4 for the auxiliary raw material to the chute 10.

A predetermined quantity of the molten pig iron 28 is accomodated in the smelting reduction furnace 1. The prereduced iron ores after being prereduced in the prereduction furnace 2 are fed to the smelting reduction furnace 1.

The auxiliary raw materials such as coal or flux is fed to the smelting reduction furnace 1 via the chute 10.

The convertor type reaction vessel 5 is blown with oxygen by the lance 6 vertically inserted through the top opening 5a of the vessel 5. The stirring gas such as nitrogen is injected into the molten pig iron 28 by the gas injection nozzles 7. Carbon monoxide gas is generated by the reaction between the carbon from the carbonaceous material like coal fed to the smelting reduction furnace and the carbon in the molten pig iron 28, and the oxygen gas introduced through the lance 6. A portion of the generated carbon monoxide gas reacts with the excess oxygen introduced through the lance 6 to generate carbon dioxide gas. The iron ores fed into the molten pig iron 28 are melted and reduced by the generated heat in the above-mentioned exothermic reations and by the reaction agent, i.e., carbon and carbon monoxide gas.

The high temperature exhaust gas from the smelting reduction furnace 1 is discharged from the gas outlet 11 installed at the hood 8, passing through the gas supply pipe 22 and introduced into the gas blowing chamber 14 of the prereduction furnace 3. The high temperature gas is injected into the prereduction chamber 15 through the nozzles 13 of the distributor 12 and preheats and prereduces the iron ores which are fed from the storage bin 3 through the duct 26 and the chute 17.

The prereduced iron ores are introduced to the discharge pipe 19 via the discharge hole 12a installed at the center of the distributor 12 and fed to two intermediate storage bins 21 via the L-shaped valve 20. The prereduced iron ores are alternatively fed to these storage bins and temporarily stored therein. The prereduced iron ores are alternatively discharged from these bins into the smelting reduction furnace 1 through the chute 9. Thus the iron ores are prereduced before the smelting reduction reaction, which enhances the thermal efficiency of the process.

The distributor 12 is made of a ceramics which is heated by the high temperature gas from the smelting reduction furnace 1 injected by the nozzles 13 into the prereduction furnace 2. The high temperature gas contains dust such as fine particles of iron ore having a size under 10 micrometers which cannot be removed by the dust collecting cyclone 23 shown in FIG. 1. These dust particles contain alkali components having Na and K which are sticky in the high temperature gas having the temperature over 900° C. These dust particles stick to the comparatively rough bottom surface of the distributor 12 and to the inside surface of the nozzles 13 and are heated by the accumulated heat in the distributor and are sintered hard. Thus, the stuck dust particles gradually accumulate on the surfaces and the flow of the gas is so much disturbed that a normal fluidizing can not be continued.

SUMMARY OF THE INVENTION

It is an object of the invention to provide a prereduction furnace of a smelting reduction facility of iron ores wherein the dust particles in the gas from the smelting reduction furnace do not stick to the distributor of the prereduction furnace.

The invention provides a prereduction furnace of a smelting reduction facility of iron ores comprising:

a fluidizing prereduction chamber, i.e., the upper part of the prereduction furnace wherein iron ores are fed and prereduced;

a gas blowing chamber, i.e., the lower part of the prereduction furnace wherein a reducing gas is fed;

a distributor installed between said fluidizing prereduction chamber and said gas blowing chamber;

a first plurality of nozzles passing through said distributor for injecting said reducing gas in the blowing chamber into the prereduction chamber;

a discharge pipe for discharging prereduced iron ores installed at a bottom center of the prereduction chamber extending through said distributor, wherein a cooling fluid flows;

at least two horizontally movable purging pipes below the distributor; and a second plurality of nozzles attached to said horizontally movable purging pipes for injecting a purging gas to a bottom surface of the distributor.

DESCRIPTION OF THE PREFERED EMBODIMENTS

In the conventional distributor of the prior art, the material of the distributor is a ceramics. Since the surface of the ceramics distributor is comparatively rough, the dust particles stick to the surface of the distributor very easily.

A gas purging device to force the stuck dust on the distributor to be removed is utilized to accelerate the dust removal. This gas purging device is equipped with nozzles for injecting a purging gas directed to the bottom surface of the distributor.

Figure 1:
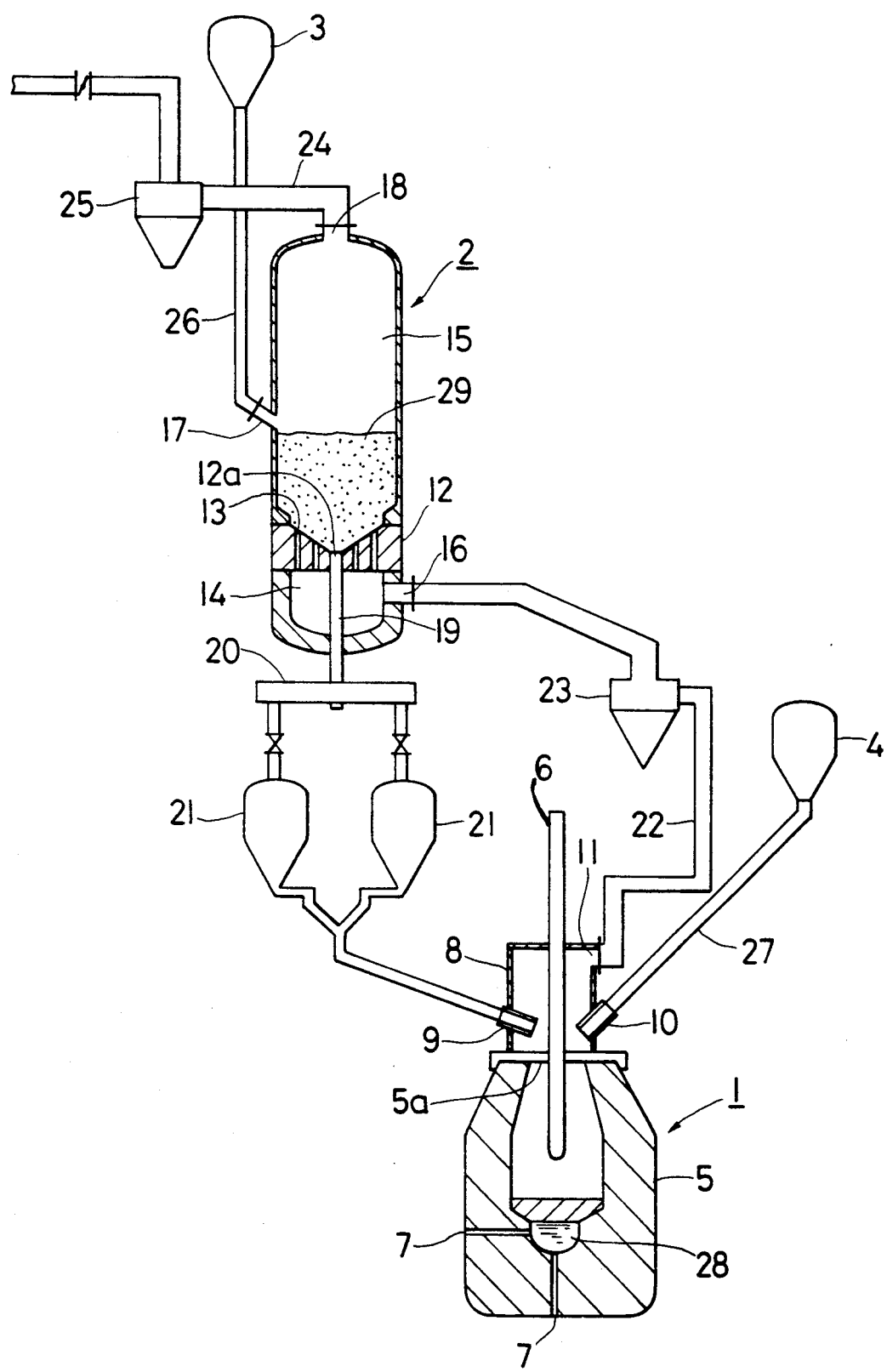
FIG. 1 is an explanatory illustration of a smelting reduction facility.
Figure 2:
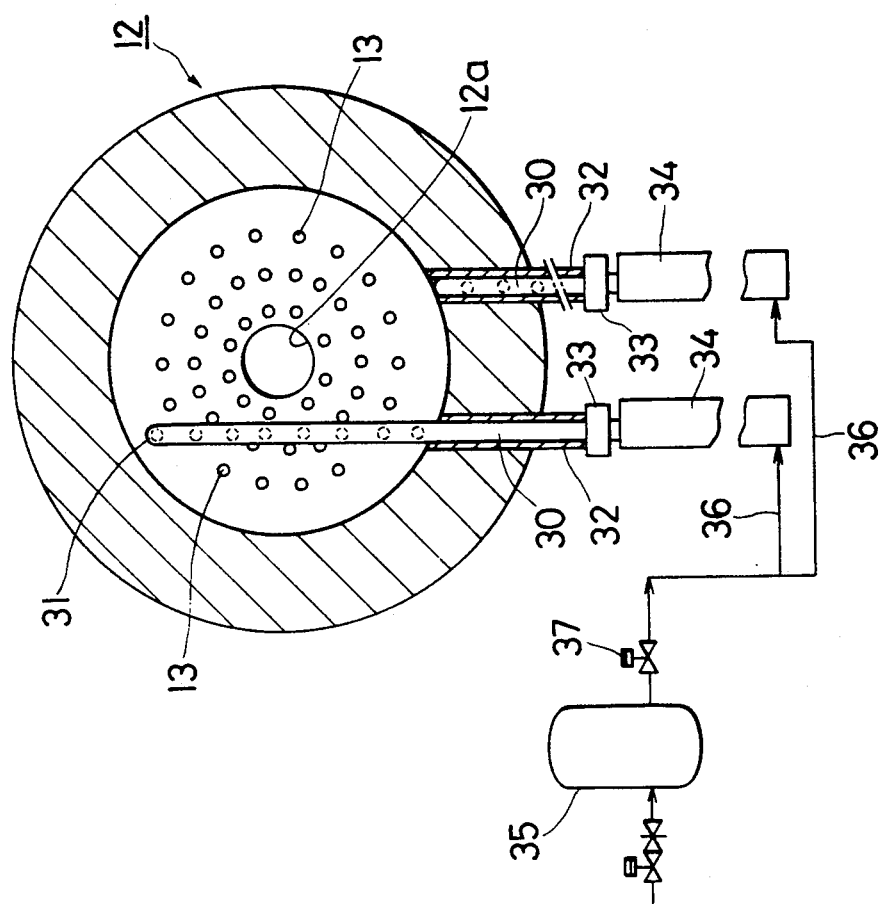
FIG. 2 is a partially cutaway view of the horizontal arrangement of the purging device.
Figure 3:
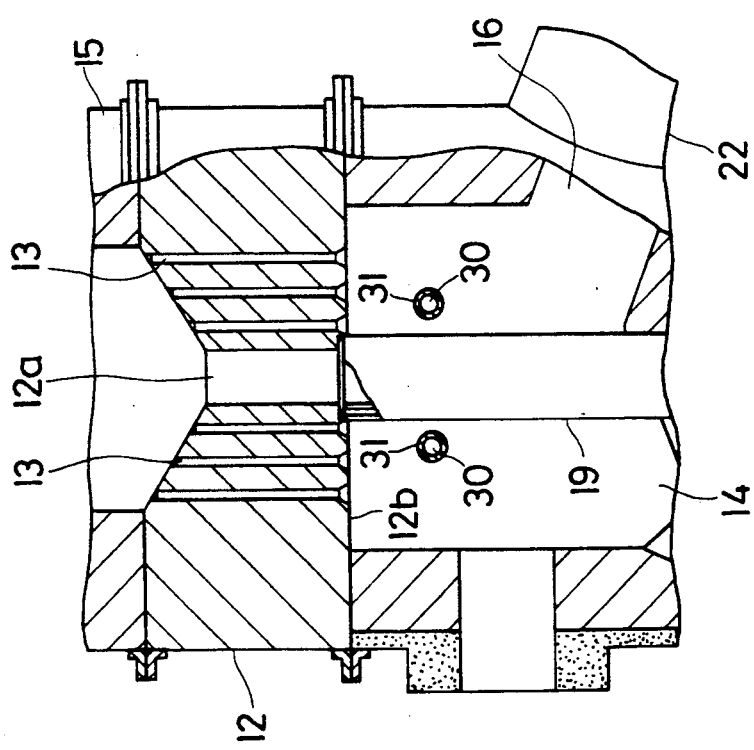
FIG. 3 is a vertical sectional view of an embodiment of the invention.

FIG. 2 is a partially cutaway view of the horizontal arrangement of the purging device. FIG. 3 is a vertical sectional view of an embodiment of the invention.

As shown in FIGS. 2 and 3, the distributor 12 which divides the top fluidizing prereduction chamber 15 from the bottom gas blowing chamber 14 of the prereduction furnace has a discharge hole 12a which is surrounded by the nozzles 13 made of ceramic pipes for injecting a reducing gas into the prereduction chamber 15. The discharge pipe 19 is connected to the discharge hole 12a. Below the bottom surface of the distributor 12 and on both sides of the exhaust pipe 19, two gas purging pipes 30 are installed. The gas purging pipes 30 are horizontally movable and equipped with gas injection nozzles 31 at their front halves which inject the purging gas towards the bottom surface of the distributor 12.

The rear halves of the purging pipes 30 are outside of the furnace. The sheath pipes 32 are installed at the side wall of the prereduction furnace and the purging pipes 30 can be inserted in or retracted from the gas blowing chamber 14 through the sheath pipes 32. Moving mechanisms 33 are installed at the outside of the prereduction furnace.

The moving mechanisms 33 have reciprocating chains the ends of which are held by an extended part of the furnace. By these reciprocating chains the purging pipes 30 are inserted in or retracted from the gas blowing chamber 14 through the sheath pipes 32.

The pipes 34 are connected to the ends of the pipes 30 at the outside of the furnace. The conduit pipes 36 extended from the gas supply 35 are connected to the pipes 34. The valve 37 is installed in the conduit pipe 36. The gas purging pipe 30 may be rotated by a driving mechanism not shown in FIG. 2.

The gas purging pipe 30 can remove the dust stuck to the bottom surface of the distributor by blowing a purging gas through the gas injection nozzles 31. The gas purging pipes 30 are usually retracted to the outside of the furnace and inserted into the gas blowing chamber 14 by the moving mechanisms 33, and inject the purging gas, for instance, an innert gas to the bottom surface 12b of the distributor 12. As the result, the dust particles stuck to the bottom surface 12b of the distributor 12 are blown off by the purging gas. Therefore the bottom ends of the nozzles 13 on the bottom surface 12b of the distributor 12 are not clogged by the dust.

The discharge hole 12a having and inner diameter of 200 mm is installed at the central part of the distributor 12 of the prereduction furnace having a height of 10 m and an inner diameter of 1 m, which is surrounded by the ceramic nozzles 13 having an inner diameter of 26 mm.

At the both sides of the discharge pipe 19 and at the vertical position below the distributor 12 by the distance of 300 mm, two horizontally movable gas purging pipes 30 are installed. The gas pressure in the gas blowing chamber 14 situated below the distributor 12 and that in the prereduction chamber 15 are measured. When the difference between these pressures increases above a predetermined value and the clogging of the nozzles is detected, the gas purging pipes 30 are inserted into the gas blowing chamber 14 and a purging gas supplied at the pressure of 20 kg/cm$^2$ G is injected to the bottom surface 12b of the distributor 12.

As the result, the dust stuck to the bottom surface 12b of the distributor 12 drops off and the open ends of the nozzles 13 on the bottom surface 12b of the distributor 12 are not clogged, which enables a smooth operation of the furnace.

Figure 4:
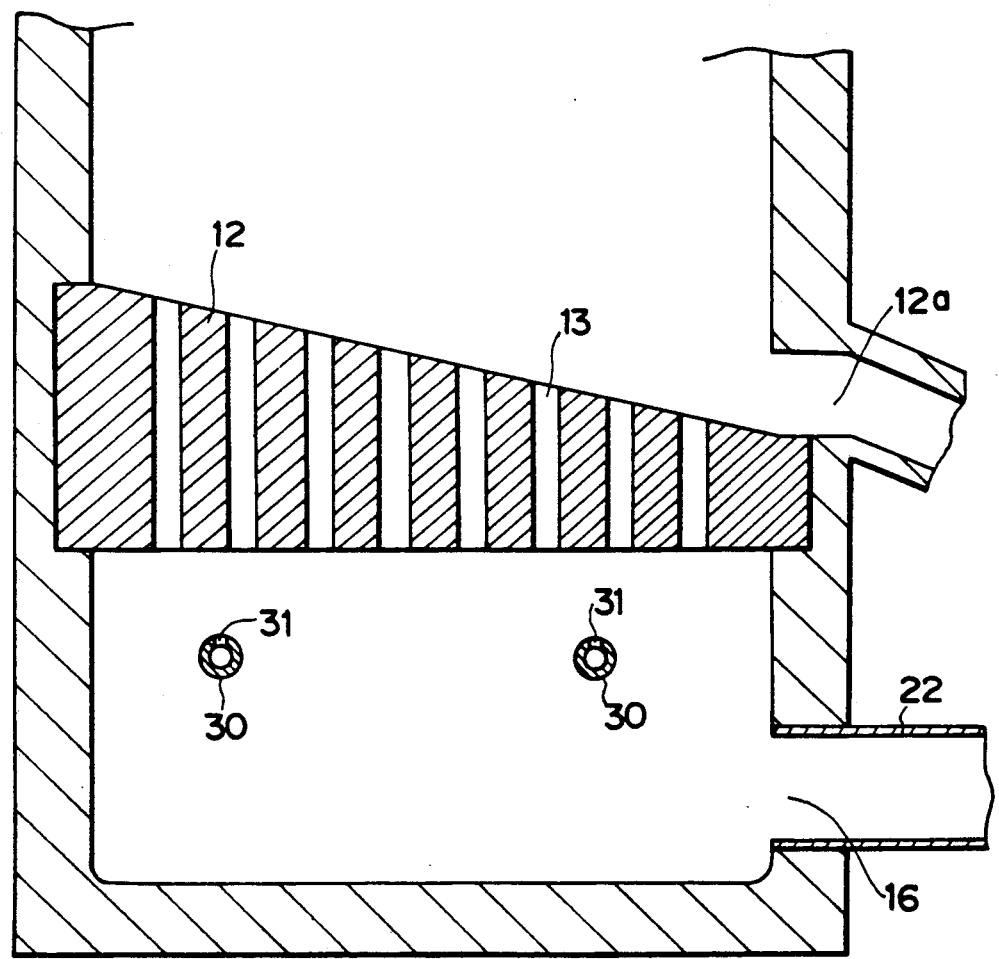
FIG. 4 is vertical sectional view of another embodiment of the invention.

FIG. 4 is a vertical sectional view of another embodiment of the invention. In the FIG. 4 embodiment the, discharge hole 12a is located at the side wall of the prereduction chamber 15 and the discharge pipe 19 is installed at the outside of the prereduction furnace.

What is claimed is:

1. A prereduction furnace of a smelting reduction facility of iron ore, the prereduction furnace having an upper part where iron ores are fed thereto to be prereduced, and a lower part wherein a reducing gas is fed, the prereducing furnace comprising:

a fluidizing prereduction chamber at the upper part of the prereduction furnace for receiving iron ores therein for prereduction;

a gas blowing chamber at the lower part of the prereduction furnace for receiving a reducing gas therein;

a distributor arranged in the prereduction furnace between said fluidizing prereduction chamber and said gas blowing chamber so as to separate said chambers from each other;

a first plurality of nozzles passing through said distributor for injecting said reducing gas in said gas blowing chamber into said fluidizing prereduction chamber;

a discharge pipe mounted at a bottom portion of said fluidizing prereduction chamber and extending through said distributor for discharging prereduced iron ores from the prereduction furnace;

at least two horizontally movable gas purging pipes mounted in the prereduction furnace below said distributor; and a second plurality of nozzles coupled to said horizontally movable gas purging pipes and arranged inside said gas blowing chamber for injecting a purging gas to a bottom surface of said distributor to remove particles from the bottom surface of said distributor to prevent clogging of lower ends of said first plurality of nozzles.

2. The prereduction furnace of claim 1, wherein said discharge pipe is mounted at a bottom center portion of said fluidizing prereduction chamber.

3. A prereduction furnace of a smelting reduction facility of iron ore, the prereduction furnace having an upper part wherein iron ores are fed thereto to be prereduced, and a lower part wherein a reducing gas is fed, the prereducing furnace comprising:

a fluidizing prereduction chamber at the upper part of the prereduction furnace for receiving iron ores therein for prereduction;

a gas blowing chamber at the lower part of the prereduction furnace for receiving a reducing gas therein;

a distributor arranged in the prereduction furnace between said fluidizing prereduction chamber and said gas blowing chamber so as to separate said chambers from each other;

a first plurality of nozzles passing through said distributor for injecting said reducing gas in said gas blowing chamber into said fluidizing prereduction chamber;

a discharge pipe mounted in communication with said fluidizing prereduction chamber for discharging prereduced iron ores from the prereduction furnace;

at least two horizontally movable gas purging pipes mounted in the prereduction furnace below said distributor; and a second plurality of nozzles coupled to said horizontally movable gas purging pipes and arranged inside said gas blowing chamber for injecting a purging gas to a bottom surface of said distributor to remove particles from the bottom surface of said distributor to prevent clogging of lower ends of said first plurality of nozzles.

4. The prereduction furnace of claim 3, wherein said discharge pipe is mounted to a side wall of said fluidizing prereduction chamber.

* * * * *

UNITED STATES PATENT AND TRADEMARK OFFICE
CERTIFICATE OF CORRECTION

PATENT NO. : 5,149,062

DATED : September 22, 1992

INVENTOR(S) : MATSUO et al

It is certified that error appears in the above-identified patent and that said Letters Patent is hereby corrected as shown below:

Column 1, line 52, delete "installed".

Column 4, line 21, change "and" to read --an--.

Signed and Sealed this

Twenty-sixth Day of October, 1993

Attest:

BRUCE LEHMAN

Attesting Officer

Commissioner of Patents and Trademarks